United States Patent [19]
Gronlund et al.

[11] 3,913,237
[45] Oct. 21, 1975

[54] METHOD OF AND A PLANT OF PRODUCING CEMENT CLINKER FROM CEMENT SLURRY

[75] Inventors: Martin Gronlund, Holte; Klaus Erik Gude, Vedbaek, both of Denmark

[73] Assignees: Aktieselskabet Niro Atomizer, Soborg, Denmark; F. L. Smidth & Co., Cresskill, N.J.

[22] Filed: Dec. 26, 1973

[21] Appl. No.: 427,614

[30] Foreign Application Priority Data
Jan. 5, 1973   Denmark ................ 46/73

[52] U.S. Cl. .............. 34/10; 34/57 R; 432/15; 432/58; 432/106
[51] Int. Cl.² .............. F26B 3/08; F27B 15/00
[58] Field of Search ........... 34/10, 57 A; 35/57 R; 432/15, 58, 106

[56] References Cited
UNITED STATES PATENTS

| | | |
|---|---|---|
| 2,912,768 | 11/1959 | Huston et al. .................. 34/57 R |
| 3,145,094 | 8/1964 | Nakajima ...................... 432/58 |
| 3,441,258 | 4/1969 | Gieskieng ..................... 34/10 |
| 3,452,968 | 7/1969 | Shimizu et al. ................ 432/58 |
| 3,477,874 | 11/1969 | Repsdorph et al. .............. 34/10 |
| 3,752,455 | 8/1973 | Zacpal ........................ 432/58 |
| 3,834,860 | 9/1974 | Fukuda et al. ................. 432/58 |

*Primary Examiner*—John J. Camby
*Attorney, Agent, or Firm*—Sughrue, Rothwell, Mion, Zinn & Macpeak

[57] ABSTRACT

A method of and a plant for producing cement clinker from a cement slurry which is dried in a spray drier with the aid of discharge gas originating from a cement kiln. The spray dried cement raw meal derived from the spray drier is preheated and for this preheating process a separately heated gas is employed, which gas is obtained from a heating unit with a fresh air inlet and with a hot air outlet, said outlet being connected with a heat exchanger having a powder inlet which is connected with the powder outlet of the drier and a powder outlet which is connected with the powder inlet of the kiln.

10 Claims, 7 Drawing Figures

METHOD OF AND A PLANT OF PRODUCING CEMENT CLINKER FROM CEMENT SLURRY

FIELD OF THE INVENTION

The present invention relates to a method of producing cement clinker from cement slurry which is dried in a spray drier with the aid of discharge gas originating from a cement kiln and in which is preheating of the spray-dried powdered cement raw meal which is derived from the spray drier is carried out.

DESCRIPTION OF THE PRIOR ART

A plant is known from British patent specification No. 1,283,122 in which the discharge gas coming from the kiln is heat-exchanged with the spray-dried material and where the gas is subsequently utilized as drying gas during the spray drying process.

It is intended thereby to achieve a reduction in the alkali content of the finished material as well as in the alkali deposits in the plant at points where these may result in interrupting the operation and, with this object in view, certain gas temperatures are stated in the specification after the gas has been utilized for the preheating and after the spray drying process, as well as for heating the material.

It is conceivable to achieve, in this way, a greater capacity for an existing rotary kiln installation or, for a new installation, to be able to dimension the kiln shorter while retaining the same capacity, e.g. by preheating the raw meal to up to approximately 800°C whereby, with a given heat consumption in the kiln, it is possible to process a greater volume of material than if the same is introduced at a lower temperature.

However, this will result in a substantial rise in the discharge gas temperature of the rotary kiln, for instance, to up to approximately 1300°C, which is not permissible on account of the construction materials generally employed in the connection between the rotary kiln and the associated stationary gas chamber.

OBJECT OF THE INVENTION

The present invention for its object to provide a method in connection with which it is possible — without such an increased temperature of the rotary kiln gases — to achieve an increased capacity according to the invention, this is achieved by separately heated gas being used for preheating process, the discharge gas produced in the preheating process contributing to the spray drying process.

ADVANTAGES OF THE INVENTION

The advantages obtained in the prior art plant dealt with concerning alkali deposits and alkali content of the finished material are retained in their entirety while the separately-heated gas employed in the invention for preheating purposes can be produced with the aid of fresh air and will thus not give rise to alkali condensation when mixed with the powder. Moreover, the capacity is materially increased without requiring deleteriously high temperatures of the discharge gas of the rotary kiln. However, added to this comes the further advantage that, in spite of the increased production of clinker in the rotary kiln, it is possible to retain a conveniently low gas velocity in the same while otherwise, in order to increase the production, it is necessary to increase the volume of fuel as well as the volume of air employed for the combustion, whereby the velocity of the gas in the kiln rises. In addition, a greater reliablity and flexibility is attained in the process since, due to the preheating with a separate heater, there will be much better possibilities for carrying out a satisfactory production under varying operational conditions by adapting the quantity of heat that is supplied during the separate preheating process in relation to the momentary production and to the quantity of heat which originates from the rotary kiln gases.

Finally, by preheating the powder to a high temperature, the flow properties of the powder are improved and the tendency towards the accumulation of material in the introduction end of the kiln and leakage through the kiln sealing are thus reduced or altogether avoided.

Moreover, the invention pertains to a plant for carrying out the method dealt with consisting of a rotary kiln for the production of cement clinker and a spray drier for drying cement slurry and the characteristic feature of this plant according to the invention consists in a heating unit with a fresh air inlet and a hot gas outlet, which outlet communicates with a heat exchanger provided with a powder inlet that communicates with the powder outlet of the drier and a powder outlet which communicates with the powder inlet of the rotary kiln, said heat exchanger being further provided with a gas outlet that communicates with the drying chamber of the spray drier.

BREIF DESCRIPTION OF THE DRAWINGS

The invention is explained below in greater detail with reference to the accompanying drawings, in which.

DETAILED DESCRIPTION OF SOME PREFERRED EMBODIMENTS

Figure 1:
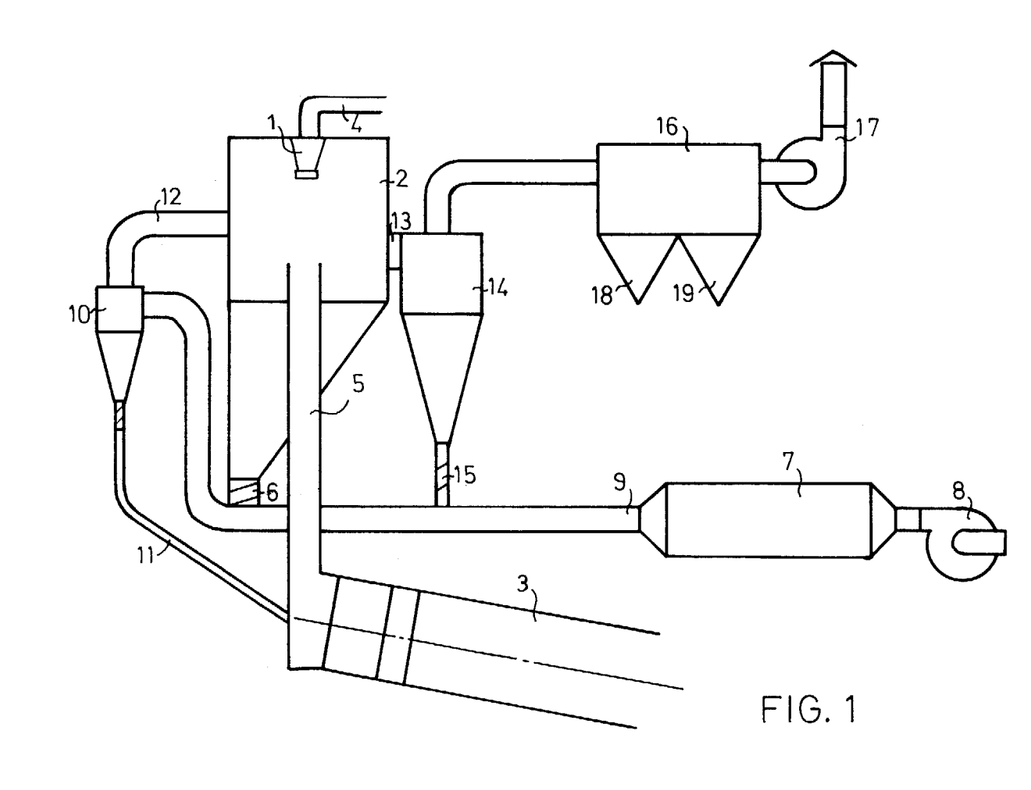
FIGS. 1–7 illustrate different embodiments of the plant according to the invention.

FIG. 1 shows a spray drier consisting of an atomizer wheel 1 and a drying chamber 3, while 3 denotes a rotary kiln for the production of cement clinker. The spray drier 1, 2 is provided with a cement slurry inlet 4 and a drying gas supply pipe 5, as well as a powder outlet 6. The drying gas supply pipe 5, also constitutes, at the same time, the riser pipe from rotary kiln 3.

According to the invention, the dry powder from the spray drier is not conveyed direct from the powder outlet 6 to the rotary kiln 3, but is first subjected to a preheating process with the aid of a separately heated gas.

This is done by means of a gas heater 7 which may, for example, contain one or several oil burners and to which fresh air is fed by means of a blower 8 while the hot gas is supplied through a duct 9.

Powder outlet 6 communicates with this duct 9 in such a way that the powder is mixed with the hot gas in said duct and is conveyed with it to a cyclone 10 or a cyclone battery composed of several cyclones in which the preheated powder is separated and conveyed to rotary kiln 3 via a pipe 11. The discharge gas from the cyclone 10 is conducted via a pipe 12 to drying chamber 2 and thereby contributes to the drying process.

The discharge gas from drying chamber 2 is conducted via a pipe 13 to cyclone 14 where the entrained powder is separated and — via a pipe 15 — is introduced into duct 9 where it is likewise preheated and, together with the powder from outlet 6, is introduced into rotary kiln 3 via cyclone 10.

The discharge gas from cyclone 14 passes through a filter 16, e.g. an electrofilter, in which the very fine powder which is not separated in cyclone 14, for the most part, separated. A blower 17 in the outlet of filter 16 provides the requisite low pressure for driving the discharge gas from drying chamber 2 through cyclone 14 and filter 16 and conducts away the substantially cleansed waste gas.

If, as shown, the filter is a filter with several sections, the separated powder from its first section or sections 18 may possibly be conveyed back to duct 9, while the powder separated in its following section or sections 19 is, as a rule, too alkaline for it to be conveyed back but, if this is the case, it will be possible to utilize it for another purpose in a known manner.

Figure 2:
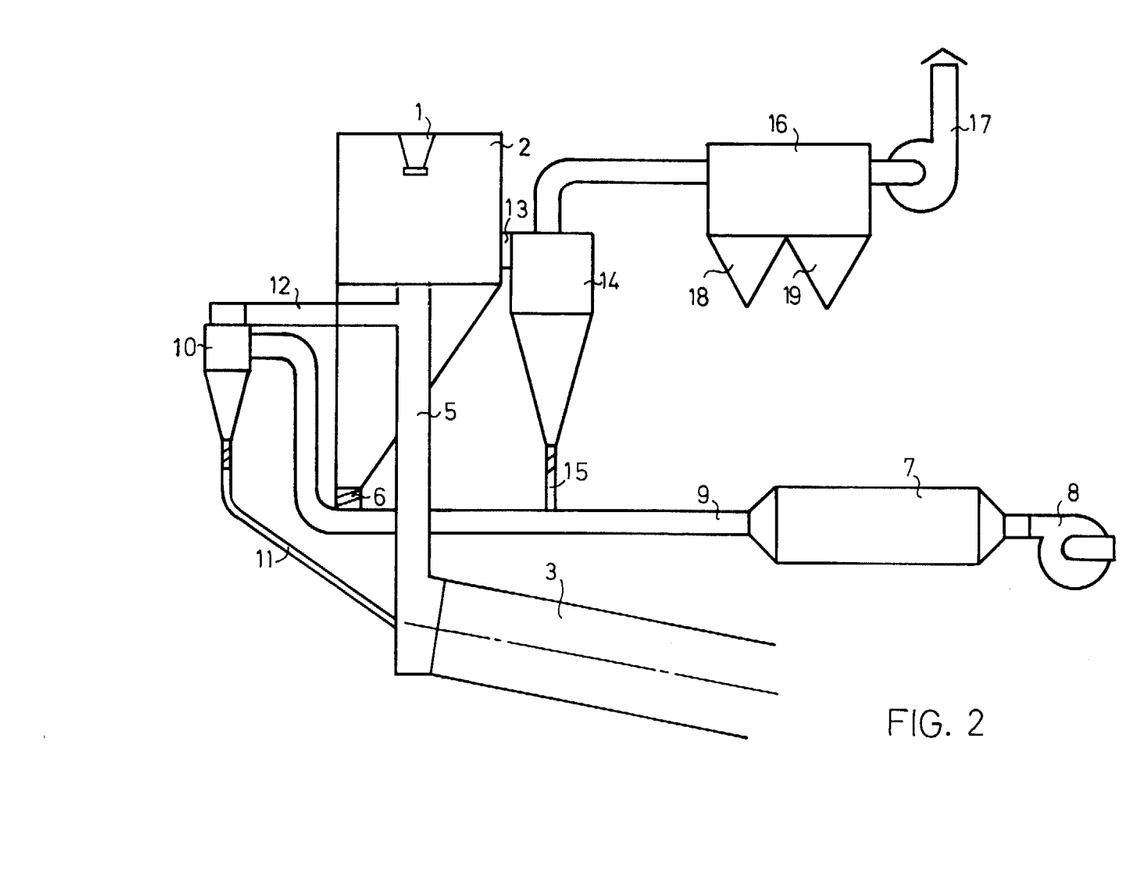

The embodiment shown, in FIG. 2 corresponds generally to the embodiment shown in FIG. 1. It differs therefrom solely by the circumstance that the discharge gas from cyclone 10 — via pipe 12 — is not introduced into chamber 2 directly but, on the contrary, it is introduced into inlet pipe 5 in such a way that the gas, in conjunction with the discharge gas from rotary kiln 3, is introduced into drying chamber 2.

Figure 3:
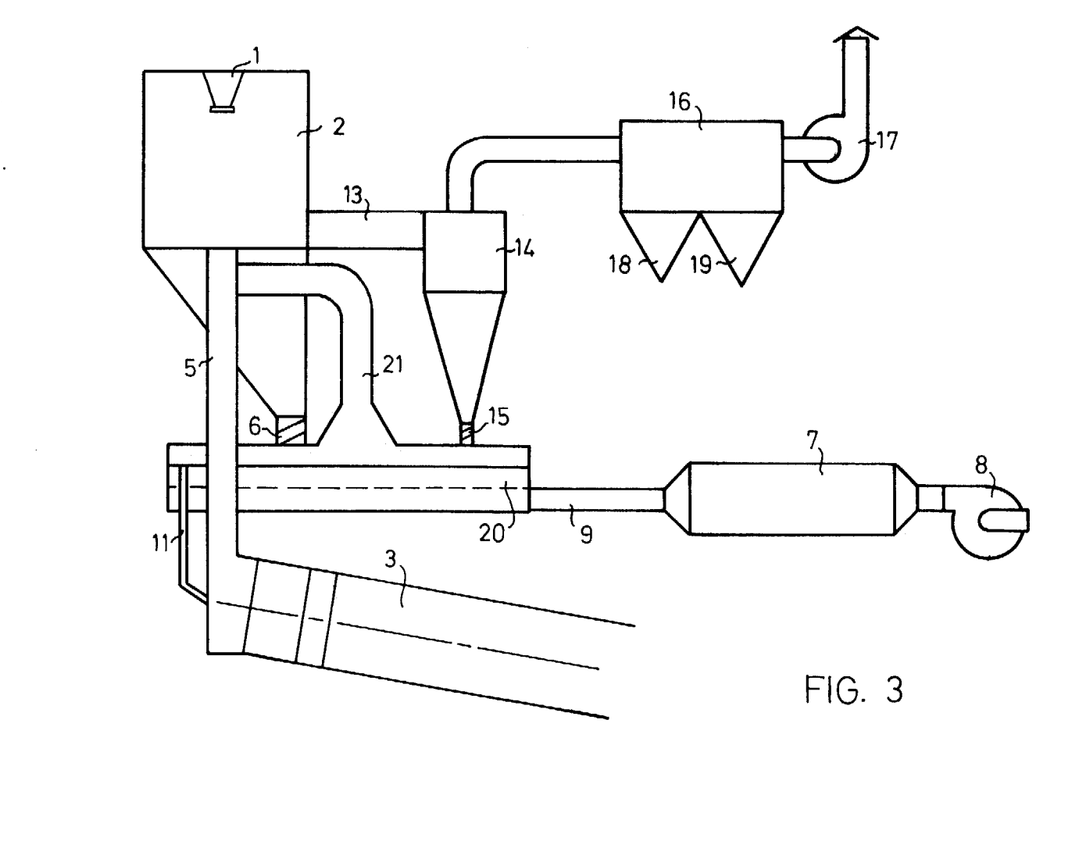

The embodiment shown in FIG. 3 also corresponds generally to the embodiment shown in FIGS. 1 and 2. However, on one single point a significant difference does exist in the apparatus of FIG. 3 in this embodiment, the cyclone 10 and a portion of duct 9 are replaced by a heat exchanger 20 provided with a fluidized bed. The powder outlet 6 and pipe 15 from cyclone 14 constitute the powder inlet to the fluidized bed, while the gas from duct 9 is introduced into the preheater 20 and, in a single operation, fluidizes and heats the powder supplied. Subsequently, just as in the embodiments according to FIGS. 1 and 2, the powder is introduced into rotary kiln 3 via pipe 11. The discharge gas from preheater 20 is passed through a pipe 21 to pipe 5. However, it is also possible — similar to the pipe 12 in FIG. 1 — to conduct said gas directly to drying chamber 2.

Figure 4:
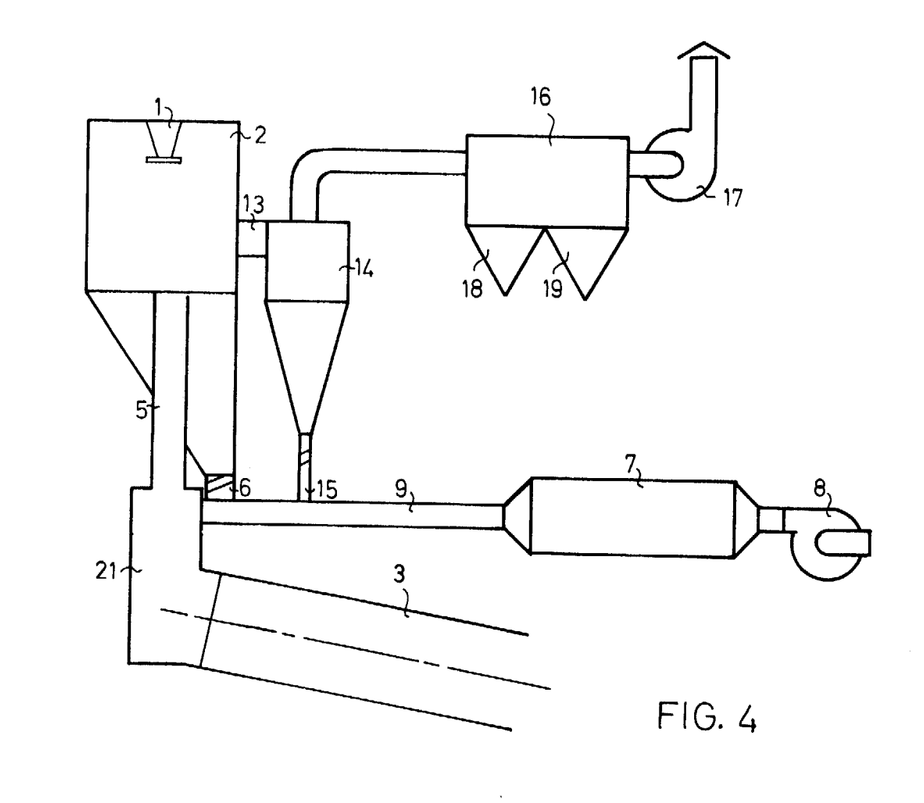

In the embodiment depicted in FIG. 4, cyclone 10 shown in FIGS. 1 and 2 has been omitted as a separate element. In its place a cyclone 21 is employed which is directly built together with the rotary kiln 3 and the pipe 5.

The embodiment shown in FIG. 5, which has to be regarded as particularly expedient, differs very greatly from what has been described in connection with the preceding figures. In this embodiment, powder outlet 6 from drying chamber 2 and pipe 15 from cyclone 14 — instead of being led directly to duct 9 — lead into riser pipe 25 of rotary kiln 3. The gas discharge pipe 26 of cyclone 10 is also lead to riser pipe 25, and that pipe is then led to a cyclone 23 in which the powder is separated and, via the discharge pipe 24, introduced into duct 9. From duct 9, the gas, with the preheated powder is conducted into cyclone 10, where the powder is separated and, via pipe 11, introduced into rotary kiln 3. The gas discharge pipe from cyclone 23 is constituted by the drying gas supply pipe 5 leading to drying chamber 2. In the embodiment depicted in FIG. 5, the powder outlet 6 of drying chamber 2 is made to communicate with the gas inlet pipe of cyclone 23 immediately before the inlet to cyclone 23, and discharge pipe 15 of cyclone 14 is made to communicate with the gas discharge pipe 25 of rotary kiln 3. However, it is immediately clear that the connections could also be reversed and that it would also be possible to make powder outlets 6 and 15 to communicate solely with gas discharge pipe 26 of cyclone 10 leading towards cyclone 23, or solely with discharge pipe 25 of kiln 3. Just as it is possible to make each of them communicate with an individual one of pipes 25 and 26, it is also possible that both of the pipes 25 and 26 could be connected with the powder outlets 6 and 15 individually or in an assembled manner, e.g. in a fractionally assembled manner, for instance by the pipes 25 and 26 being brought together at a point which, seen in the direction of flow, is located before the connecting points of powder outlets 6 and 15 which, in turn, are located before the inlet to cyclone 23. Anyway, the powder supplied from drying chamber 2 via outlets 6 and 15 is preheated in two stages that are placed in counter current. In the first stage, the powder is preheated in cyclone 23 with the aid of the discharge gas from the rotary kiln 3 via duct 25 together with the discharge gas from cyclone 10 via duct 26. In the second stage in, the powder is preheated duct 9 and cyclone 10 with the aid of the discharge gas from gas heater 7. Thus, in a simple manner, in additional preheating step has been introduced in that the discharge gas from rotary kiln 3 and from cyclone 10, does not solely contribute to the spray drying process in drying chamber 2 via cyclone 23 and pipe 5, as in the aforementioned plants. Rather, the discharge gas from rotary kiln 3 and from cyclone 10, also brings about a preliminary preheating of the powder supplied from drying chamber 2 via powder outlet 6 and of the powder supplied from cyclone 14 via pipe 15, which preliminary preheating process is subsequently supplemented with the preheating in duct 9 and in cyclone 10 prior to the thus particularly intensively pre-heated powder being supplied to rotary kiln 3 via pipe 11. In comparison with the embodiments shown in FIGS. 1–4, the embodiment according to FIG. 5 will thus possess the advantage that it is possible, with a relatively small gas heater, to obtain a substantially higher temperature of the preheated powder. The temperature may even become so high that a partial calcination of the powder will be possible prior to its introduction into the rotary kiln. In addition, the possibility of controlling the temperature of the preheated raw meal that is supplied to the rotary kiln will be more favourable because the gas heater has to contribute to a part only of the temperature rise of the powder during the preheating process.

Figure 6:
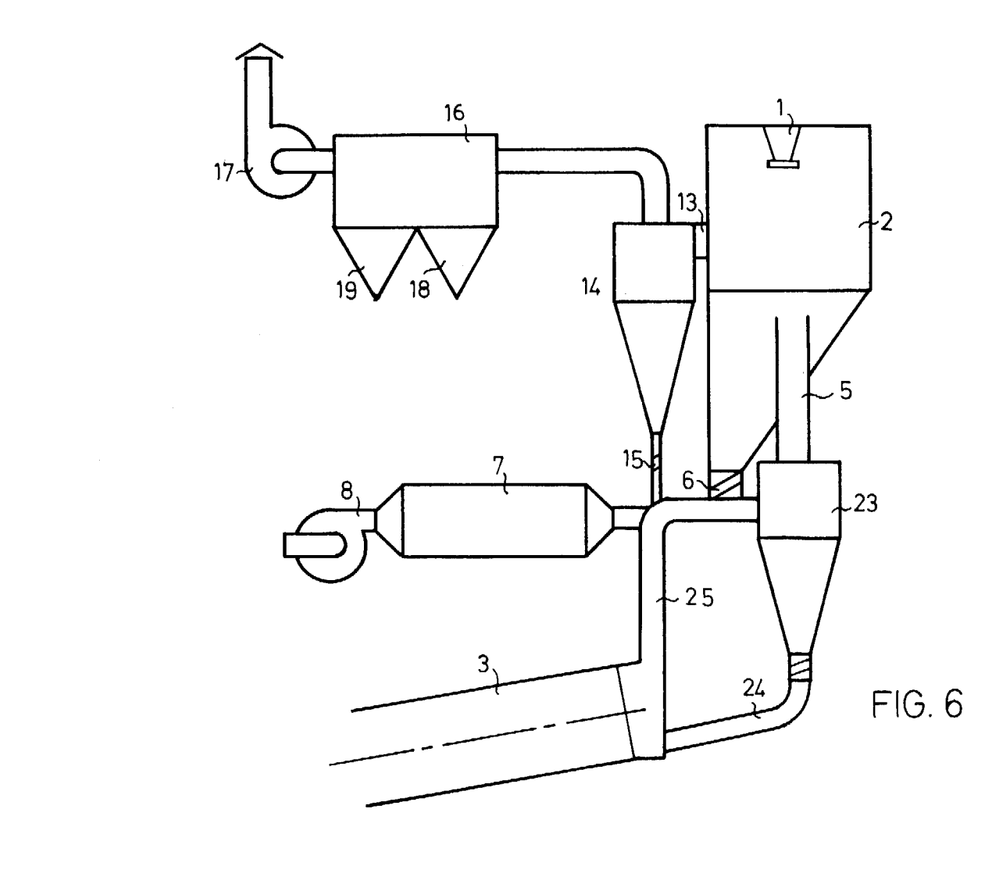

The embodiment shown in FIG. 6 corresponds substantially to the embodiment illustrated in FIG. 4 with the sole difference that the cyclone 21 which, in FIG. 4, is directly built together with the rotary kiln 3, is replaced by a separate cyclone 23, into which the discharge gas from the rotary kiln is introduced via pipe 25. Before the pipe 25 is introduced into cyclone 23, the powder outlet 6 from drying chamber 2 and the powder discharge pipe from cyclone 14, as well as the gas discharge pipe from gas heater 7 are led to pipe 25.

Figure 7:
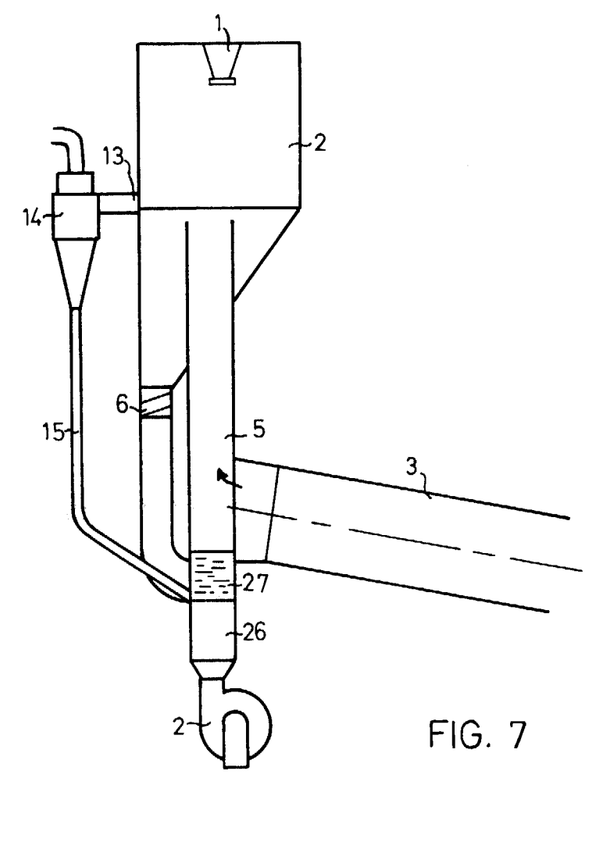

In the embodiment shown in FIG. 7, a preheater with a fluidized bed is used just as in FIG. 3, but the embodiment differs substantially and, in a constructional respect, is greatly simplified. Gas inlet pipe 5 which, also in this embodiment, likewise fulfills the function of the riser pipe from rotary kiln 3, continues downwardly below this to a gas heater 26 through a fluidized bed 27, to which both powder outlet 6 from drying chamber 2 and the powder outlet pipe 15 from cyclone 14 are led.

EXAMPLE 1

A plant as shown in FIG. 1 was used.

The spray drying plant was made by Niro Atomizer.

The diameter of the drying chamber was 10 m. The plant was provided with a centrifugal atomizer. The diameter of the atomizer wheel was 240 m. 70 t/h of slurry having a solids content of 62% were pumped from a slurry basin to the atomizer of the spray drying plant. The discharge gas from the rotary kiln was conducted to the spray drying plant in a quantity of 126,000 kg/h at an inlet temperature of 580°C measured in duct 5. The drying air contained a dust quantity of the order of magnitude of 40 t/h. The discharge gas from the spray drying plant had a temperature of 180°C and the spray-dried raw meal had a temperature of 170°C. The discharge gas from cyclone 10 amounted to approximately 33,000 kg/h and had a temperature of 490°C. About 84 t/h of cement raw meal, preheated to 49°C, was supplied to rotary kiln 3 via duct 11.

EXAMPLE 2

A plant as shown in FIG. 2 was used.

The spray drying plant was as described in Example 1.

91 t/h of slurry having a solids content of 62% were pumped from a slurry basin to the atomizer. The discharge gas from the rotary kiln was conducted to the spray drying plant in a quantity of 126,000 kg/h at an inlet temperature of 650°C measured in duct 5. The drying air contained a dust quantity of the order of magnitude of 30 t/h. The temperature of the discharge gas from the spray drying plant and of the spray-dried raw meal was as described in Example 1. The discharge gas from cyclone 10 amounted to approximately 66,000 kg/h and had a temperature of 600°C. About 102 t/h of cement raw meal, preheated to 600°C, were supplied to the rotary kiln 3 via duct 11. The quantity of heat supplied per kg of clinker produced was the same as in Example 1.

EXAMPLE 3

Figure 5:
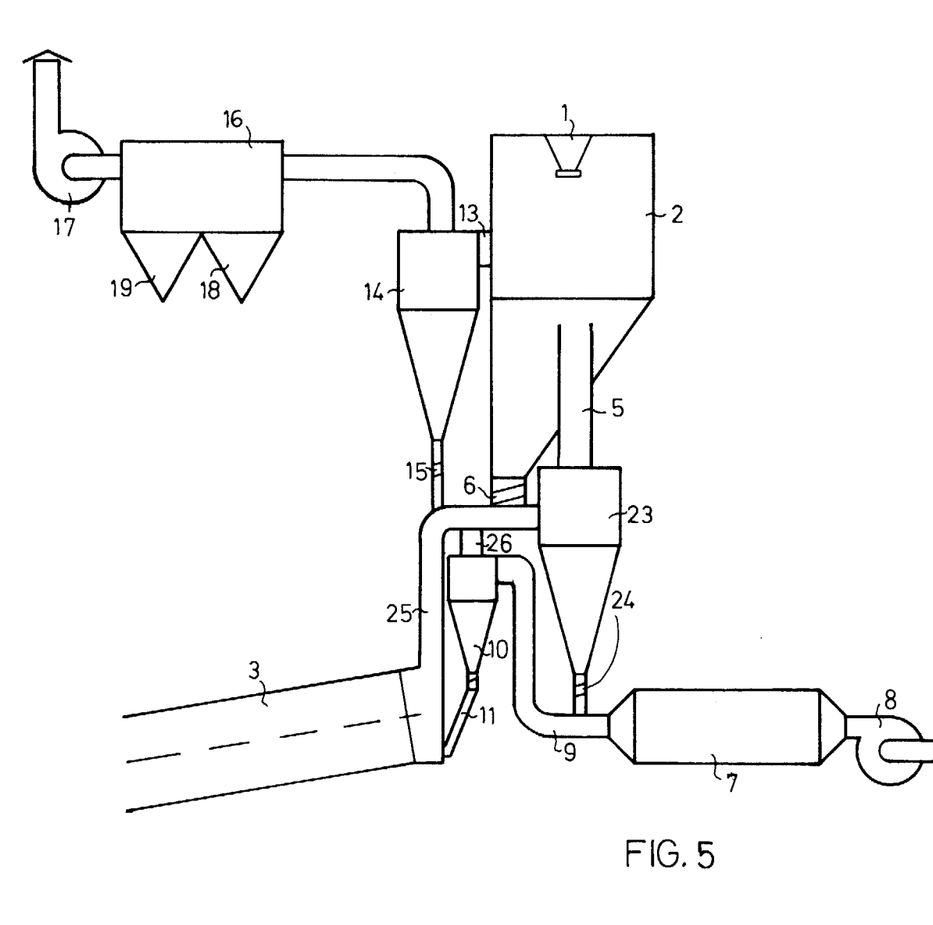

A plant as shown in FIG. 5 was used.

The spray drying plant was as described in Example 1.

70 t/h of slurry having a solids content of 62% were pumped from a slurry basin to the atomizer. The discharge gas from the rotary kiln amounted to 126,000 kg/h and had an inlet temperature of 800°C measured in duct 25 and contained a quantity of dust of the order of magnitude of 35 t/h. The temperature of the discharge gas from the spray drying plant and of the spray-dried raw meal was as described in Example 1. The spray-dried raw meal from drying chamber 2 and cyclone 14 was introduced into duct 25 and preheated in cyclone 23 to a temperature of 650° prior to its being introduced into exhaust gas duct 9 from gas heater 7. Additional heating and beginning calcination of the spray-dried raw meal took place in exhaust gas duct 9 with 33,000 kg/h of exhaust gas from gas heater 7.

About 84 t/h of raw meal preheated to 730°C were supplied to rotary kiln 3 via duct 11.

The quantity of heat supplied per kg clinker produced was the same as in Example 1.

What we claim is:

1. A method of producing cement clinker from cement slurry said method comprising the steps of:
   a. introducing cement slurry into an atomizing device in a spray drier, said atomizing device having means for generating a whirling spray;
   b. spraying the cement slurry from the atomizing device into the drying chamber of the spray drier in order to produce spray-dried powder cement raw meal;
   c. preheating the spray-dried powder cement raw meal at least in part with a separately heated gas; and
   d. after the separately heated gas has been used in preheating the spray-dried powdered cement raw meal, introducing the separately heated gas into the spray drier to help in the spray drying step.

2. A method as recited in claim 1 wherein in step (c) the separately heated gas is used together with discharge gas originating from a cement kiln to which the powdered cement raw meal is conducted after having been spray-dried and pre-heated.

3. A plant for producing cement clinker from cement slurry, said plant comprising:
   a. a spray drier having an atomizing device which generates a whirling spray and which serves as an inlet for the cement slurry, a drying chamber for drying the cement slurry, a powder outlet, at least one gas inlet, and a gas outlet;
   b. a rotary kiln for producing cement clinker from spray-dried cement raw meal derived from said spray drier, said rotary kiln having a powder inlet and a gas outlet;
   c. first means providing communication between the gas outlet of said rotary kiln and a gas inlet of said spray drier;
   d. a heating unit having a fresh air inlet and a hot air outlet;
   e. a heat exchanger having a powder inlet, a powder outlet, a gas inlet, and a gas outlet;
   f. second means providing communication between the powder outlet of said spray drier and the powder inlet of said heat exchanger;
   g. third means providing communication between the powder outlet of said heat exchanger and the powder inlet of said rotary kiln;
   h. fourth means providing communication between the hot air outlet of said heating unit and the gas inlet of said heat exchanger; and
   i. fifth means providing communication between the gas outlet of said heat exchanger and a gas inlet of said spray drier.

4. A plant as claimed in claim 3 and further comprising;
   a cyclone for the separation of entrained powder, said cyclone having a gas inlet and a powder outlet;
   b. sixth means providing a communication between the gas outlet of said spray drier and the gas inlet of said cyclone; and
   c. seventh means providing communication between the powder outlet of said cyclone and the powder inlet of said heat exchanger.

5. A plant as claimed in claim 3 wherein said heat exchanger is constituted by a cyclone.

6. A plant as claimed in claim 3 wherein said heat exchanger is constituted by a fluidized bed.

7. A plant as claimed in claim 6 wherein:
   a. said fourth and fifth means comprise a duct leading from the hot air outlet of said heating unit to a gas inlet of said spray drier;

b. said fluidized bed has been incorporated into said duct; and c. said first means communicates with said duct above said fluidized bed.

8. A plant as claimed in claim 3 wherein the powder inlet and the gas inlet of said heat exchanger comprise a common duct which serves as an introductory heat exchanging chamber.

9. A plant as claimed in claim 3 wherein the gas outlet of said rotary kiln communicates with said heat exchanger.

10. A plant as claimed in claim 3 wherein the gas outlet of said rotary kiln, the powder outlet of said spray drier, and the gas outlet of said heat exchanger all communicate with a cyclone, said cyclone having a powder outlet which communicates with the powder inlet of said heat exchanger and a gas outlet which communicates with the gas inlet of said spray drier.

* * * * *